United States Patent [19]

Walker

[11] 4,272,471
[45] Jun. 9, 1981

[54] METHOD FOR FORMING LAMINATES COMPRISING AN ELECTRODE AND A CONDUCTIVE POLYMER LAYER

[75] Inventor: Jack M. Walker, Portola Valley, Calif.

[73] Assignee: Raychem Corporation, Menlo Park, Calif.

[21] Appl. No.: 41,071

[22] Filed: May 21, 1979

[51] Int. Cl.³ .......................................... H05B 3/10
[52] U.S. Cl. .................................... 264/104; 219/543; 219/553; 252/511; 264/171; 264/175; 264/272; 264/273; 338/22 R; 338/22 SD; 338/322
[58] Field of Search .................... 264/171, 104–105, 264/175, 272, 273; 252/511; 219/543, 553; 156/52, 243; 428/131, 138, 140; 338/22 R, 22 SD, 211, 212, 322, 331, 332

[56] References Cited

U.S. PATENT DOCUMENTS

| 3,301,932 | 1/1967 | Chisholm | 264/174 |
| 3,311,862 | 3/1967 | Rees | 219/543 |
| 3,351,882 | 11/1967 | Kohler et al. | 252/511 |
| 3,532,570 | 10/1970 | Cotter | 264/104 |
| 4,017,715 | 4/1977 | Whitney et al. | 264/105 |
| 4,129,633 | 12/1978 | Biddick | 264/273 |

FOREIGN PATENT DOCUMENTS 1167551 10/1969 United Kingdom.

Primary Examiner—Jeffery R. Thurlow
Attorney, Agent, or Firm—Lyon & Lyon

[57] ABSTRACT

Method and apparatus for continuous manufacture of a laminate comprising a layer of a conductive polymer and at least one electrode. A tape electrode and a heat-softened conductive polymer are fed simultaneously through an elongate aperture of substantially closed cross-section formed by a plurality of rollers, whereby there is produced a laminate in which the conductive polymer layer has a controlled cross-section. Preferably the electrode has a plurality of openings therein and is fed through the aperture so that there is at least one point on the electrode, as it passes through the aperture, which coincides with an angle which is formed by two of said rollers and which is at most 90°. Particularly good results are obtained when the roller which contacts the electrode has a plurality of indentations therein, so that conductive polymer not only penetrates into the openings in the electrode but also passes through those openings which overlie the indentations in the roller. Novel laminates are produced in this way.

27 Claims, 9 Drawing Figures

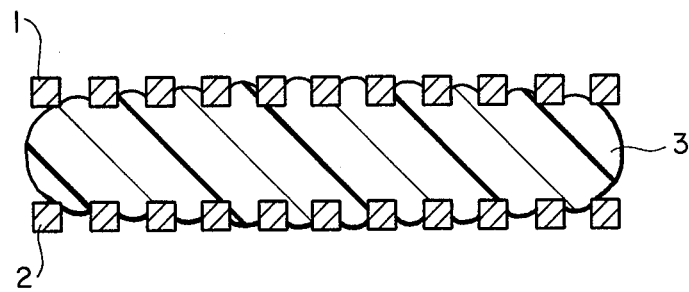
FIG_1
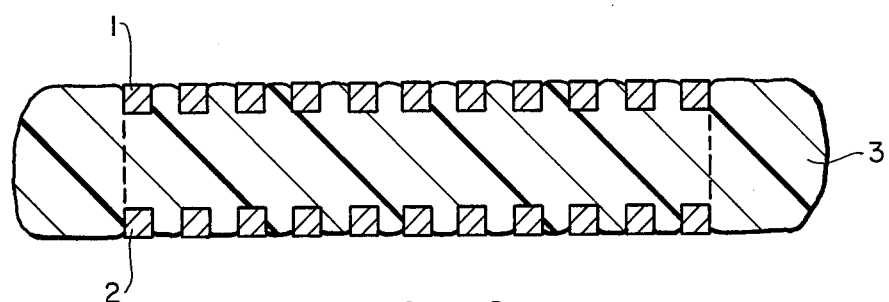
FIG_2
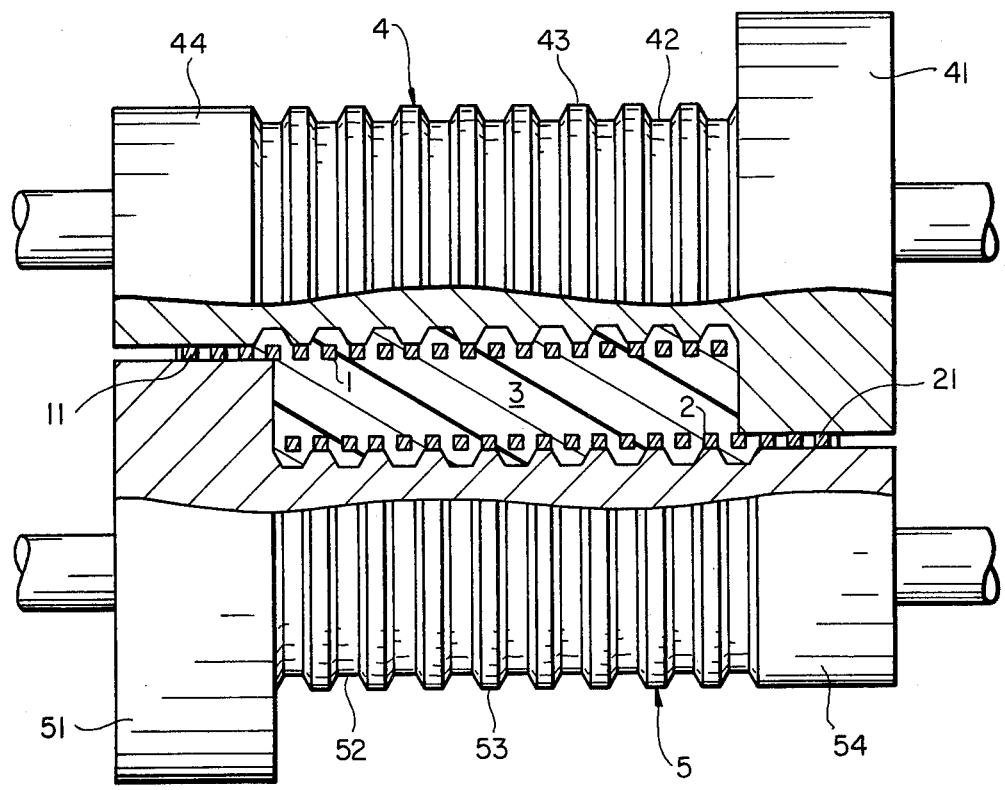
FIG_3

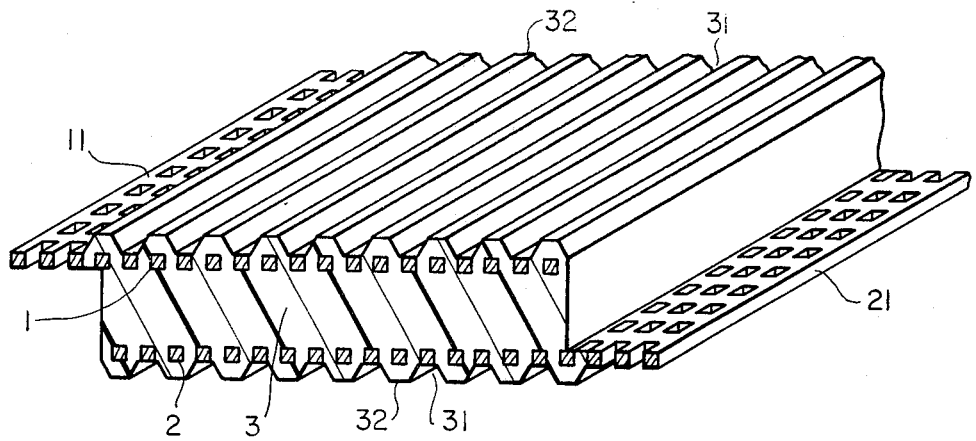
FIG_4
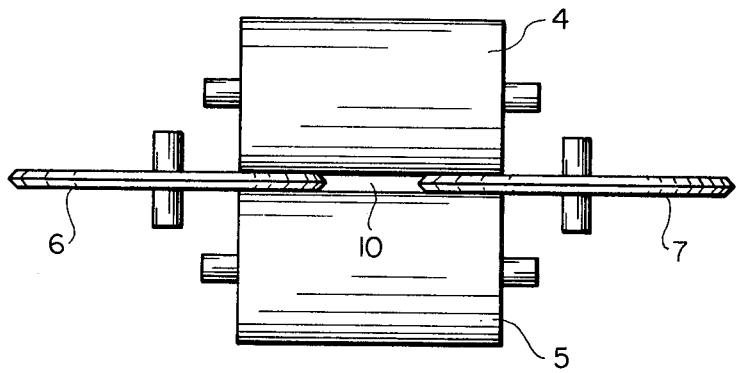
FIG_5
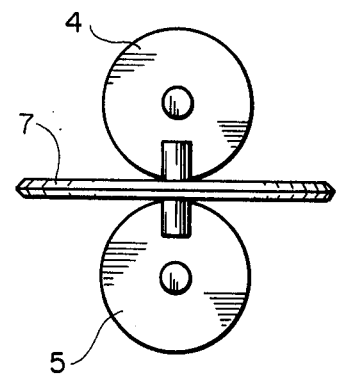
FIG_6
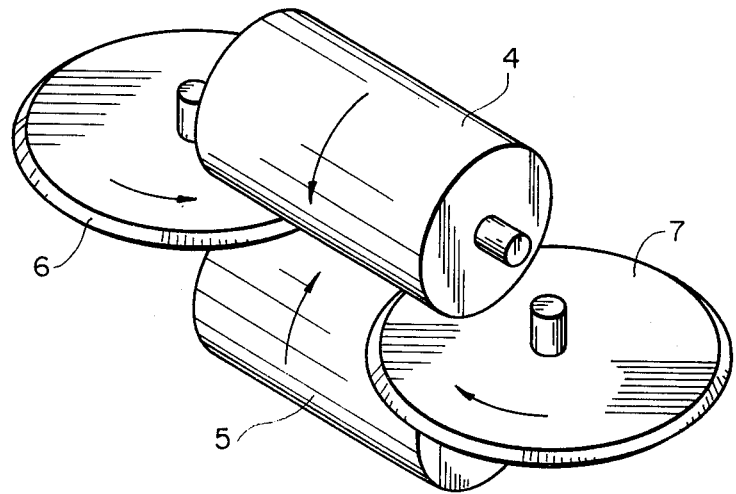
FIG_7

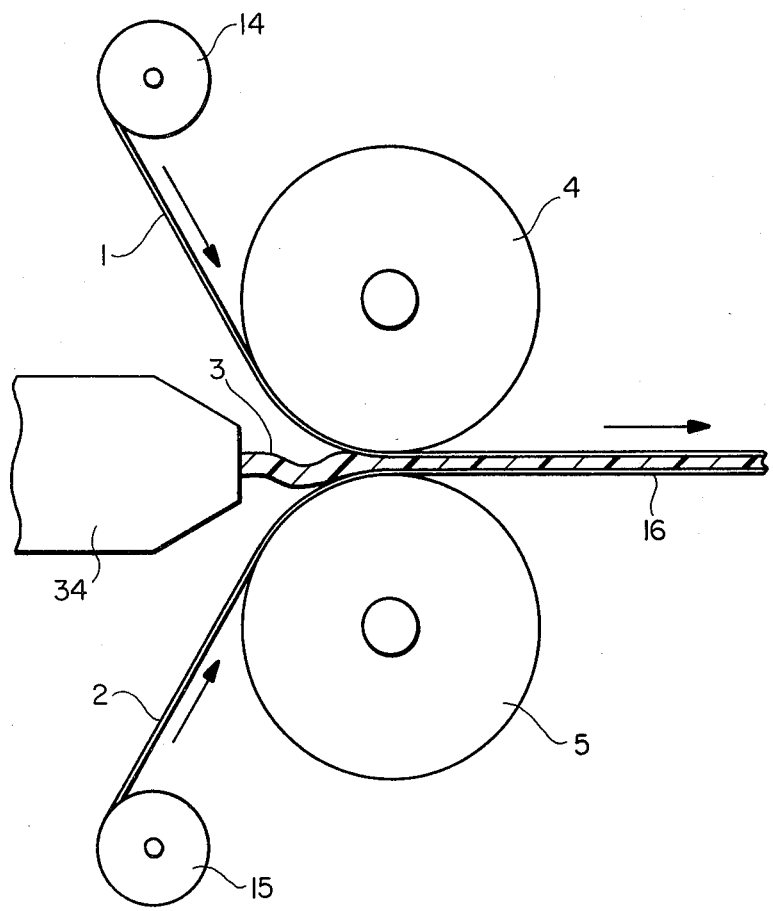
FIG_8
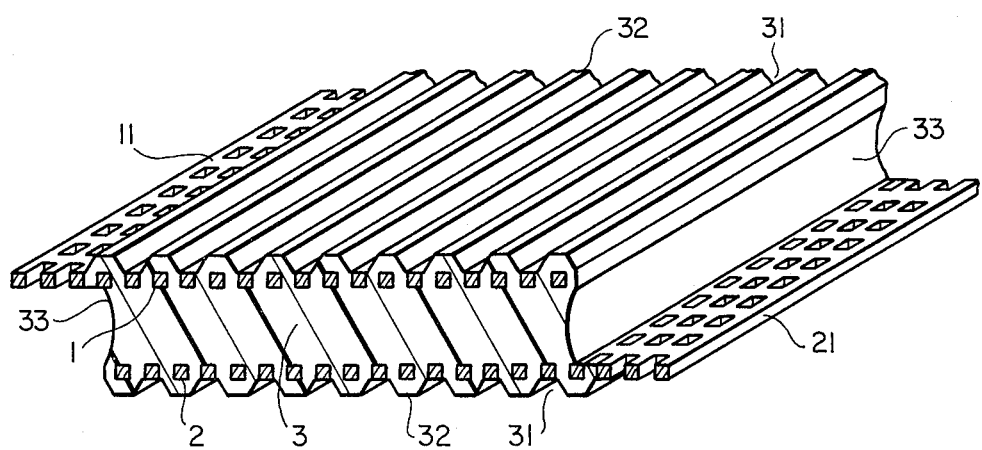
FIG_9

METHOD FOR FORMING LAMINATES COMPRISING AN ELECTRODE AND A CONDUCTIVE POLYMER LAYER

BACKGROUND OF THE INVENTION

1. Field of the Invention

This invention relates to laminates comprising a layer of a conductive polymer composition and an electrode in contact with the layer, and to methods and apparatus for making such laminates.

2. Summary of the Prior Art

Conductive polymer compositions (i.e. compositions comprising at least one polymer and electrically conductive particles dispersed in said polymer in amount sufficient to render the composition electrically conductive) are well known. Such compositions have been used in electrical devices which comprise at least one element composed of a conductive polymer composition and at least one electrode in contact with that element. Particularly useful devices of this kind comprise an element composed of a conductive polymer composition which exhibits positive temperature coefficient (PTC) behavior, and at least two electrodes which can be connected to a source of electrical power and which when so connected cause current to flow through the PTC element; the electrodes can be in direct physical contact with the PTC element or physically separated therefrom, e.g. by an element composed of a conductive polymer composition which exhibits relatively constant wattage behavior. When the conductive polymer composition is in the form of a layer, improved performance is often obtained when the electrode is in the form of a sheet, e.g. a tape or a section cut from a tape, often a sheet which is coextensive with the conductive polymer layer and/or has a plurality of openings therein. Reference may be made for example to U.S. Pat. Nos. 2,978,665 (Vernet et al), 3,243,753 (Kohler), 3,311,862 (Rees), 3,351,882 (Kohler et al) and 4,017,715 (Whitney et al) and copending and commonly assigned Applications Ser. Nos. 601,638 (Horsma et al), now U.S. Pat. No. 4,177,376, 750,149 (Kamath et al), now abandoned, 751,095 (Toy et al), now abandoned, 798,154 (Horsma), now abandoned, 873,676 (Horsma), 943,659 (van Konynenburg), now abandoned, 965,343 (van Konynenburg et al), 965,344 (Middleman et al) and 965,345 (Middleman et al), now abandoned, the disclosures of which are incorporated herein by reference.

Although, as noted above, the prior art refers to laminates comprising a layer of a conductive polymer composition and a sheet electrode in contact therewith, the known methods for producing such laminates suffer from serious disadvantages; for example discontinuous molding methods are slow and expensive and continuous lamination methods lead to products of inconsistent performance and/or are wasteful of the polymer composition.

SUMMARY OF THE INVENTION

I have now discovered a new and improved method for making such laminates by a continuous lamination method. One advantage of this new method is that the layer of conductive polymer composition has a much more closely controlled cross-section than laminates prepared by previously known continuous methods, and it has been found that this can result in improved electrical performance, especially when the short edges of the layer intersect the electrode.

In one aspect the present invention provides a method of making a laminate comprising a layer of a conductive polymer composition and an electrode in contact with said layer, said electrode being in the form of a tape, which method comprises (1) forwarding said electrode through an aperture of substantially closed cross-section which is formed by a plurality of rollers which rotate so as to forward material in contact with the rollers through said aperture, said electrode being in contact with at least one of said rollers and thereby being forwarded through said aperture;

(2) simultaneously feeding a heat-softened conductive polymer composition into said aperture at a rate sufficient to fill said aperture, whereby said composition is forwarded through said aperture in contact with said electrode; and (3) withdrawing from said aperture a laminate comprising said electrode and, adherent to said electrode, a layer of said conductive polymer composition.

In another aspect, the invention provides novel apparatus suitable for carrying out the process of the invention, said apparatus comprising (1) a plurality of rollers which together form an aperture of substantially closed cross-section and which are rotatable so as to forward material in contact with the rollers through said aperture; and preferably also comprising (2) means for forwarding an electrode in the form of a tape through said aperture in contact with at least one of said rollers; and (3) means for feeding a heat-softened conductive polymer composition into said aperture at a rate sufficient to fill said aperture.

Particularly useful results are obtained when the electrode has a plurality of openings therein and the roller which contacts the electrode has a plurality of indentations, e.g. circumferential grooves, in the surface thereof, so that the conductive polymer composition not only penetrates into the openings in the electrode, but also passes through those openings which overlie the indentations in the roller, thus resulting in improved physical and electrical contact between the electrode and the layer of conductive polymer composition. The invention further includes the novel laminates which can be produced in this way, namely laminates comprising a layer of a conductive polymer composition having a substantially constant cross-section and an electrode adherent to said layer, said electrode being in the form of a flat sheet having openings therein, said conductive polymer composition penetrating into but not through said openings in first areas of the electrode and penetrating through said openings in second areas of the electrode, said first and second areas being arranged in a regular pattern.

BRIEF DESCRIPTION OF THE DRAWINGS

The invention is illustrated in the accompanying drawings, in which

FIGS. 1 and 2 show laminates prepared by known lamination methods;

FIG. 3 shows one combination of rollers for use in the present invention;

FIG. 4 shows a novel laminate of the invention which can be prepared using the apparatus of FIG. 3;

FIGS. 5 to 7 show another combination of rollers for use in the present invention;

FIG. 8 shows the process and apparatus of the invention; and

FIG. 9 shows another novel laminate of the invention.

DETAILED DESCRIPTION OF THE INVENTION

The electrodes used in the present invention are preferably composed of metal, e.g. nickel or nickel-coated copper, and preferably have a plurality of openings therein, in order to enhance the contact between the electrode and the conductive polymer composition. The size of the openings should be sufficient to allow adequate penetration of the conductive polymer, but not so great as to adversely affect the strength or electrical properties of the laminate. For example wire mesh or expanded metal electrodes can advantageously be used. The electrode must be in the form of a tape which can be fed through the aperture formed by the plurality of rollers; but the laminate produced by the method of the invention can of course be cut into any desired length or shape. The electrode will often be in the form of a tape having parallel sides and of constant thickness, but this is not necessarily so. The electrode is preferably pre-heated so that when it is first contacted by the conductive polymer composition, it is at a temperature above the softening point of the composition [which term is used herein to denote the peak value exhibited by the composition when subjected to analysis by Differential Scanning Calorimetry (DSC)] and preferably above the Ring-and-Ball softening point of the composition. Such pre-heating is desirable because it prevents rapid quenching of the conductive polymer composition when it contacts the electrode and thus promotes adhesion of the composition and the electrode, especially when the electrode has a plurality of openings therein. The method of the invention can of course be used to prepare a laminate which comprises only one electrode, but it is generally used to prepare laminates comprising two or more electrodes, the electrodes generally (but not necessarily) being applied to opposite faces of the conductive polymer layer.

The conductive polymer composition used in the present invention can be any suitable melt-extrudable composition and the conductive particles therein can be of any type, e.g. carbon black, graphite or metallic particles. Preferred compositions exhibit PTC behavior. Many suitable conductive polymer compositions are disclosed in the prior art. Preferably the composition is fed into the aperture in the form of a pre-formed tape of appropriate dimensions, for example a freshly melt-extruded tape. Such a pre-formed tape can comprise two or more layers of different conductive polymer compositions. The preferred viscosity of the conductive polymer as it enters the aperture will depend upon the speed of lamination and the size of the openings in the electrode. The viscosity will generally be 10,000 to 300,000 poise, e.g. 10,000 to 125,000 poise.

One of the important advantages of the present invention is that by forming the laminate while the electrode and the conductive polymer composition pass through an aperture of substantially closed cross-section, there is obtained a product in which the layer of conductive polymer composition has a controlled cross-section of corresponding shape. Laminates produced by continuous lamination methods in which the edges of the conductive polymer layer are not confined will typically have cross-sections as shown in FIGS. 1 and 2, in which a layer of conductive polymer composition 3 is sandwiched between expanded metal electrodes 1 and 2. The laminate of FIG. 1 suffers from poor embedment of the electrode at the edges, while the laminate of FIG. 2, which is produced by using an excess of conductive polymer, is wasteful of polymer. In addition it has been found that the convex edge portions of such layers adjacent the electrode are subject to greater electrical stresses, frequently leading to poor performance, than edge portions which are square or concave. A laminate as shown in FIG. 2 can be trimmed to give square edges, as shown by the dotted lines, but this involves a separate manufacturing operation.

It is, therefore, preferred that there should be at least one point on the electrode, as it passes through the aperture of substantially closed cross-section, which coincides with an angle which is formed by two boundaries in the cross-section of the aperture, preferably by surfaces of two of the rollers forming the aperture, and which is at most 90°, preferably at most 80°. It is particularly preferred that no part of the cross-section of the aperture should lie outside a line drawn at right angles to the electrode at said point, so that the short sides of the resulting conductive polymer layer are straight or concave.

The shape and dimensions of the aperture will depend upon the laminate to be produced. Often the aperture will be generally rectangular in shape, with the length of the aperture being up to 400 times, for example 5 to 10 times, its width at its narrowest point, which may be for example 0.005 to 0.200 inch. Preferably each of included angles between a short side and a long side of the aperture is at most 90°.

It is often desirable for the laminate to comprise an electrode having an edge portion which is not contacted by the conductive polymer layer, so that the electrode can more easily be connected into an electrical circuit. Such a laminate can readily be made by the present invention by feeding the electrode through the aperture so that an edge portion of the electrode passes through a gap between two of the rollers defining the aperture, the width of the gap being substantially the same as the thickness of the electrode (as described, for example, in connection with FIG. 3 below).

In one preferred embodiment, the aperture is formed by a pair of rollers, one or both of which have stepped end sections which define the short sides of the aperture. Preferably the aperture is formed by a pair of rollers which are spaced apart from each other along a central section having substantially straight sides and which substantially contact each other at each end of said central section through stepped end sections on one or both of said rollers, said stepped end sections extending substantially at right angles to the straight sides of said central section. Often one of the rollers will have a stepped end section at one end of the aperture and the other will have a stepped end section at the other end of the aperture. When using such apparatus, preferably two electrodes, each in the form of a tape preferably having a width which exceeds the length of said central section, are forwarded through said aperture, one of said electrodes being in contact throughout its width with one of said rollers and the other of said electrodes being in contact throughout its width with the other of said rollers, and each of said electrodes having an edge portion which passes through a gap between one roller and the stepped end section of the other roller, the width of said gap being substantially the same as the thickness of the electrode, whereby said edge portion is not contacted by the conductive polymer composition, and each of said electrodes preferably extending across the full length of said aperture.

FIG. 3 is an elevational view, partly in cross-section, of apparatus of the kind just described and its use as just described. Rollers 4 and 5 form between them an aperture 10. Roller 4 comprises a stepped end section 41, a central section whose surface is formed by raised portions 43 which alternate with circumferential grooves 42, and a plain end section 44. Roller 5 comprises a stepped end section 51 adjacent the plain end section 44 of roller 4, a central section whose surface is formed by raised portions 53 which alternate with circumferential grooves 52, and a plain end section 53 adjacent the stepped end section 41 of roller 4. Mesh electrodes 1 and 2 and conductive polymer composition 3 are forwarded through the aperture 10 by rotation of rollers 4 and 5. Electrode 1 has an edge portion 11 which is sandwiched between plain end section 44 and stepped end section 51. Electrode 2 has an edge portion 21 which is sandwiched between plain end section 54 and stepped end section 41.

FIG. 4 is an isometric view of a laminate of the invention such as may be produced using the apparatus of FIG. 3. Expanded metal electrodes 1 and 2 are embedded in a layer of conductive polymer 3 except for edge portions 11 and 21. The conductive polymer penetrates into but not through the openings of the electrodes in areas 31 corresponding to the raised portions 43 and 53 of rollers 4 and 5, and penetrates through the openings and coalesces behind them in areas 32 corresponding to the grooves 42 and 52 of rollers 4 and 5.

In another preferred embodiment, the aperture is formed by a first pair of parallel, relatively long rollers which define the long sides of the aperture and a second pair of parallel, relatively short rollers which define the short sides of the aperture. Each of the short rollers is preferably sandwiched between end portions of the two long rollers; with this arrangement, by changing the distance between the short rollers, the length of the long sides of the aperture can readily be changed. Preferably the surfaces of the short rollers which define the short sides of the aperture are convex, so that the short sides of the resulting conductive polymer layer are concave. An arrangement of this kind is shown in FIGS. 5 to 7, in which short rollers 6 and 7 are sandwiched between long rollers 4 and 5, the rollers thus defining aperture 10. When using such apparatus, preferably two electrodes, each in the form of a tape preferably having a width which exceeds the length of the long sides of the aperture, are forwarded through the aperture, one of the electrodes being in contact throughout its width with one of the long rollers and the other being in contact throughout its width with the other long roller, and each of said electrodes having an edge portion which passes through a gap between one long roller and one short roller, the width of said gap being substantially the same as the thickness of the electrode, whereby said edge portion is not contacted by the conductive polymer composition, and each of said electrodes preferably extending across the full length of said aperture.

As noted briefly above, particularly good results are obtained when using an electrode having openings therein in conjunction with a roller having indentations in the surface thereof which contacts the electrode. The conductive polymer must not be so hot, as the laminate leaves the rollers, that polymer which has penetrated the openings of the electrode will adhere to the roller, and this limits the extent to which the conductive polymer can penetrate into the openings of an electrode which is supported by a roller having a smooth surface. If the face of the roller is provided with indentations of a suitable size and distribution, the conductive polymer not only penetrates into the openings of the electrode, but also through them, in the areas which overlie the indentations. A variety of different configurations are possible for the indentations; for example they can be provided by parallel circumferential grooves, a continuous helical groove or longitudinal grooves parallel to the axis of rotation. The proportion of the surface area of the roller occupied by the indentations (i.e. which does not contact the electrode) is preferably more than 70%, especially more than 50%. The depth of the indentations is preferably at least 0.01 inch, e.g. 0.01 to 0.025 inch, e.g. about 0.015 inch. When, as is preferred, there are two rollers which face each other and each of which has indentations in the surface thereof, the indentations can be the same or different, and when they are the same can be arranged so that they are, or are not, mirror images of each other.

FIG. 8 is a diagrammatic cross-sectional view of the process and apparatus of the invention. A freshly melt-extruded tape 3 of a conductive polymer composition is fed from extruder 31 to the aperture between a pair of rollers 4, 5 as shown in FIG. 3. Expanded metal electrodes 1 and 2 are fed from supply rolls 14 and 15 to contact either side of the tape 3 in the aperture, and thus form laminate 16.

FIG. 9 is an isometric view of another laminate of the invention. Mesh electrodes 1 and 2 are embedded in layer of conductive polymer 3 except at edge portions 11 and 21. The layer 3 has concave sides 33. Conductive polymer penetrates into but not through the openings in areas 31 and penetrates through the openings and coalesces behind them in areas 32.

The rollers used in the present invention may be of any convenient size, for example, from 3 to 24 inch in diameter, and may be rotated at any convenient speed, e.g. a surface speed of 1 to 10 ft. per minute, or substantially higher. Suitable materials for the rollers include surface-hardened steel and chromium.

It is to be understood that where this specification refers to the aperture formed by the rollers having a "substantially closed cross-section" and to rollers which "substantially contact each other", this is intended to include not only the possibility that the rollers are separated by a small gap so that an edge portion of an electrode can pass between them, but also the possibility that the rollers are separated by a small gap such that when the apparatus is in use, the gap quickly becomes filled with cooled conductive polymer, which prevents any further conductive polymer being pressed out between the rollers.

If desired, the laminate can be subjected to a treatment which will cause the conductive polymer composition to become cross-linked, e.g. an irradiation treatment.

The invention is illustrated by the following Example.

EXAMPLE

A pair of stepped rollers as shown in FIG. 3 was used to manufacture a laminate as shown in FIG. 4 by a process as illustrated in FIG. 8. The rollers had a diameter of 4 inch (measured at the raised portions 43 and 53); the depth of the grooves was 0.015 inch; the flat tops of the raised portions were 0.015 inch wide; the flat bases of the grooves were 0.045 inch wide; and the distance between corresponding points on adjacent raised portions was 0.075 inch. The length of the aperture was 0.530 inch and its width was 0.070 inch. The rollers were maintained at a temperature of about 80° C. by internal oil-heating and were rotated at a surface speed (measured at the raised portions) of about 4 feet per minute. The conductive polymer composition exhibited PTC behavior and was a dispersion of carbon black in a blend of polyethylene and an ethylene/ethyl acrylate copolymer. The composition was extruded through a slit orifice 0.410 inch long and 0.100 inch wide, and at the time of extrusion had a temperature of about 205° C. and a viscosity of 100,000 to 200,000 poise. The extrusion orifice was placed as close as possible to the rollers, about 2 inch, to minimize cooling and sagging of the extrudate before it entered the aperture. The electrodes were of nickel mesh and were about 0.005 inch thick. The openings in the mesh were diamond-shaped, with a major axis of about 0.072 inch and a minor axis of about 0.025 inch. The width of the mesh between the openings was about 0.01 inch.

I claim:

1. A method of making a laminate comprising a layer of a conductive polymer composition and an electrode in contact with said layer, which method comprises
   (1) forwarding an electrode in the form of a tape having a plurality of openings therein through an aperture of substantially closed cross-section which is formed by a plurality of rollers which rotate so as to forward material in contact with the rollers through said aperture, said electrode being in contact with at least one of said rollers and thereby being forwarded through said aperture, and said roller contacted by said electrode having a plurality of indentations in the surface thereof, whereby first areas of the electrode are in contact with said roller and second areas of said electrode overlie said indentations;
   (2) simultaneously feeding a heat-softened conductive polymer composition into said aperture at a rate sufficient to fill said aperture, whereby said composition is forwarded through said aperture in contact with said electrode and penetrates into but not through openings in said first areas of the electrode and penetrates into and through openings in said second areas of the electrode.

2. A method according to claim 1 wherein said electrode is composed of a metal.

3. A method according to claim 1 wherein said electrode when first contacted by said conductive polymer composition is at a temperature above the softening point of said composition.

4. A method according to claim 1 wherein said indentations are circumferential grooves.

5. A method according to claim 1 wherein said electrode is planar and there is at least one point on said electrode, as it passes through said aperture, which coincides with an angle which is formed by two boundaries in the cross-section of said aperture and which is at most 90°.

6. A method according to claim 5 wherein no part of the cross section of said aperture lies outside a line drawn at right angles to the electrode at said point on the electrode.

7. A method according to claim 5 wherein said angle is formed by the surfaces of two rollers.

8. A method according to claim 7 wherein said angle is at most 80°.

9. A method according to claim 7 wherein at least one edge portion of said electrode passes through a gap between two of said rollers, the width of said gap being substantially the same as the thickness of the electrode, whereby said edge portion is not contacted by said conductive polymer composition.

10. A method according to claim 1 wherein said aperture is formed by a pair of rollers which are spaced apart from each other along a central section having substantially straight sides and which substantially contact each other at each end of said central section through stepped end sections on one or both of said rollers, said stepped end sections extending substantially at right angles to the straight sides of said central section.

11. A method according to claim 10 wherein one of said rollers comprises a stepped end section at one end of said central section and the other roller comprises a stepped end section at the other end of said central section.

12. A method according to claim 11 wherein two electrodes, each in the form of a tape having a width which exceeds the width of said central section, are forwarded through said aperture, one of said electrodes being in contact throughout its width with one of said rollers and the other of said electrodes being in contact throughout its width with the other of said rollers, and each of said electrodes extending across the full width of said central section and having an edge portion which passes through a gap between one roller and the stepped end section of the other roller, the width of said gap being substantially the same as the thickness of the electrode, whereby said edge portion is not contacted by said conductive polymer composition.

13. A method according to claim 1 wherein said aperture is formed by a first pair of parallel, relatively long rollers which define the long sides of the aperture and a second pair of parallel, relatively short rollers which define the short sides of the aperture.

14. A method according to claim 13 wherein the surfaces of the short rollers defining the short sides of the aperture are convex.

15. A method according to claim 13 wherein each of the short rollers is sandwiched between end portions of the two long rollers.

16. A method according to claim 13 wherein two electrodes, each in the form of a tape having a width which exceeds the length of the long sides of the aperture, are forwarded through the aperture, one of the electrodes being in contact throughout its width with one of the long rollers and the other being in contact throughout its width with the other of the long rollers, and each of said electrodes having an edge portion which passes through a gap between one long roller and one short roller, the width of said gap being substantially the same as the thickness of the electrode, whereby said edge portion is not contacted by said conductive polymer composition.

17. A method of making a laminate comprising a layer of a conductive polymer composition and an electrode in contact with said layer, which method comprises (1) forwarding an electrode in the form of a planar tape having a plurality of openings therein through an aperture which has a generally rectangular substantially closed cross-section and which is formed by a plurality of rollers which rotate so as to forward material in contact therewith through said aperture, said electrode being in contact with a roller which provides one of the long sides of said aperture, said electrode thereby being forwarded through said aperture, and there being at least one point on said electrode, as it passes through said aperture, which coincides with an angle in the cross-section of said aperture which is at most 90°;

(2) simultaneously feeding into said aperture a heat-softened conductive polymer composition, said composition being fed into said aperture at a rate sufficient to fill said aperture, whereby said composition is forwarded through said aperture in contact with said electrode; and (3) withdrawing from said aperture a laminate comprising said electrode and penetrating into openings therein, a layer of said conductive composition, said layer having a substantially constant cross-section.

18. A method according to claim 17 wherein said conductive polymer composition is one which, when solidified, exhibits PTC behavior.

19. A method according to claim 17 wherein two electrodes, each in the form of a planar tape have a plurality of openings therein, are forwarded through said aperture in contact with said conductive polymer composition, one of said electrodes being in contact with a roller which provides one of the long sides of said aperture and the other of said electrodes being in contact with the roller which provides the other of the long sides of said aperture, and there being at least one point on each of said electrodes, as it passes through said aperture, which coincides with an angle in the cross-section of said aperture which is at most 90°.

20. A method according to claim 17 wherein said angle in the cross-section of the aperture is at most 80°.

21. A method according to claim 19 wherein said angle in the cross-section of the aperture is at most 80°.

22. A method according to claim 19 wherein at least one edge of each of said electrodes extends at least to a junction between two rollers.

23. A method according to claim 22 wherein at least one edge portion of each electrode passes through a gap between two of said rollers, the width of said gap being substantially the same as the thickness of the electrode, whereby said edge portion is not contacted by said conductive polymer composition.

24. A method according to claim 19 wherein each electrode when first contacted by said conductive polymer composition is at a temperature above the softening point of said composition.

25. A method according to claim 19 wherein each of said rollers which contact said electrodes has a plurality of indentations in the surface thereof, whereby said conductive polymer composition passes through openings in said electrodes which overlie said indentations.

26. A method according to claim 19 wherein said aperture is formed by a pair of rollers which are spaced apart from each other along a central section having straight sides and which substantially contact each other at each end of said central section through a stepped end section on one of the rollers at one end of the central section and through a stepped end section on the other of the rollers at the other end of the central section, said stepped end sections extending substantially at right angles to the straight sides of said central section; and two electrodes, each in the form of a tape having a width which exceeds the width of said central section, are forwarded through said aperture, one of said electrodes being in contact throughout its width with one of said rollers and the other of said electrodes being in contact throughout its width with the other of said rollers, and each of said electrodes extending across the full width of said central section and having an edge portion which passes through a gap between one roller and the stepped end section of the other roller, the width of said gap being substantially the same as the thickness of the electrode, whereby said edge portion is not contacted by said conductive polymer composition.

27. A method according to claim 19 wherein said aperture is formed by a first pair of parallel, relatively long rollers which define the long sides of the aperture and a second pair of parallel, relatively short rollers which define the short sides of the aperture.

* * * * *